United States Patent
Anderson

(10) Patent No.: US 10,812,496 B2
(45) Date of Patent: Oct. 20, 2020

(54) AUTOMATIC GENERATION OF CLUSTER DESCRIPTIONS

(71) Applicant: CISCO TECHNOLOGY, INC., San Jose, CA (US)

(72) Inventor: Blake Harrell Anderson, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 1291 days.

(21) Appl. No.: 14/872,336

(22) Filed: Oct. 1, 2015

(65) Prior Publication Data

US 2017/0099304 A1   Apr. 6, 2017

(51) Int. Cl.
G06F 16/00 (2019.01)
H04L 29/06 (2006.01)
G06F 16/28 (2019.01)

(52) U.S. Cl.
CPC ........ H04L 63/1416 (2013.01); G06F 16/285 (2019.01)

(58) Field of Classification Search
CPC .......................... H04L 63/1416; G06F 16/285
USPC ........................................................... 706/12
See application file for complete search history.

(56) References Cited

U.S. PATENT DOCUMENTS

| | | | |
|---|---|---|---|
| 7,540,025 B2 | 5/2009 | Tzadikario | |
| 8,561,193 B1* | 10/2013 | Srivastava | G06F 21/563 713/152 |
| 8,806,629 B1 | 8/2014 | Cherepov et al. | |
| 9,148,442 B2 | 9/2015 | Kraemer et al. | |
| 9,762,593 B1* | 9/2017 | Kennedy | H04L 63/1416 |
| 9,948,671 B2* | 4/2018 | Perdisci | H04L 63/145 |
| 2002/0107858 A1* | 8/2002 | Lundahl | G06K 9/6218 |
| 2007/0211280 A1* | 9/2007 | Bansal | G06F 9/50 358/1.15 |
| 2013/0097706 A1* | 4/2013 | Titonis | G06F 21/56 726/24 |
| 2016/0196174 A1* | 7/2016 | Jacob | G06F 11/0781 714/37 |
| 2016/0226904 A1* | 8/2016 | Bartos | G06F 21/566 |

OTHER PUBLICATIONS

U.Bayer,P.M.Comparetti,C.Hlauschek,C.Kruegel,and E.Kirda,"Scalable,Behavior-Based Malware Clustering" In Network and Distributed System Security(NDSS),vol. 9.Citeseer,2009,p. 8-11.

A. K. Jain, M. N. Murty, and P. J. Flynn, "Data Clustering: A Review," ACM Computing Surveys (CSUR), vol. 31, No. 3, pp. 264-323, 1999.

"Yara," http://plusvic.github.io/yara/, [Online; accessed May 12, 2015].

(Continued)

*Primary Examiner* — Hien D Khuu
(74) *Attorney, Agent, or Firm* — Cindy Kaplan

(57) ABSTRACT

In one embodiment, a method includes receiving data associated with a cluster at a computer and processing the data at the computer to automatically generate a description of the cluster. The data includes cluster data comprising data within the cluster and non-cluster data comprising a remaining set of the data. The description comprises a minimal set of features that uniquely defines the cluster to differentiate the cluster data from non-cluster data. An apparatus and logic are also disclosed herein.

16 Claims, 4 Drawing Sheets

(56) References Cited

OTHER PUBLICATIONS

"Stix," https://stix.mitre.org/, [Online; accessed May 12, 2015].
J. Newsome, B. Karp, and D. Song, "Polygraph: Automatically Generating Signatures for Polymorphic Worms," in Symposium on Security and Privacy (S&P). IEEE, 2005, pp. 226-241.
K.Rieck, et al,"Learning and classification of malware behavior," in Detection of Intrusions and Malware, and Vulnerability Assessment (DIMVA). Springer, 2008, pp. 108-125.
B.Anderson,et al"Multiple Kernel Learning Clustering with an Application to Malware" in Proceedings of the International Conference on Data Mining,ICDM. IEEE, 2012, pp. 804-809.
HPKriegel,et al"Clustering High-Dimensional Data:A Survey on Subspace Clustering,Pattern-Based Clustering,and Correlation Clustering," ACM Transactions . . . ,vol. 3,No. 1,p. 1,2009.
M. Halkidi, Y. Batistakis, and M. Vazirgiannis, "Clustering Validity Checking Methods: Part II," ACM Sigmod Record,vol. 31, No. 3, pp. 19-27, 2002.
KL Wagstaff,et al."Guiding Scientific Discovery with Explanations using DEMUD," in Proceedings of the Association for the Advancement of Artificial Intelligence,AAAI, 2013.
E. Strumbelj and I. Kononenko, "An Efficient Explanation of Individual Classifications using Game Theory," The Journal of Machine Learning Research, vol. 11, pp. 1-18, 2010.
K. Wang, G. Cretu and S.J. Stolfo,"Anomalous Payload-Based Worm Detection and Signature Generation" in Recent Advances in Intrusion Detection(RAID).Springer,2006, pp. 227-246.
"GNU Linear Programming Kit, Version 4.55," http://www.gnu.org/software/glpk/glpk.html.
M. Padberg and G. Rinaldi, "A Branch-and-Cut Algorithm for the Resolution of Large-Scale Symmetric Traveling Salesman Problems," SIAM review, vol. 33, No. 1, pp. 60-100, 1991.

\* cited by examiner

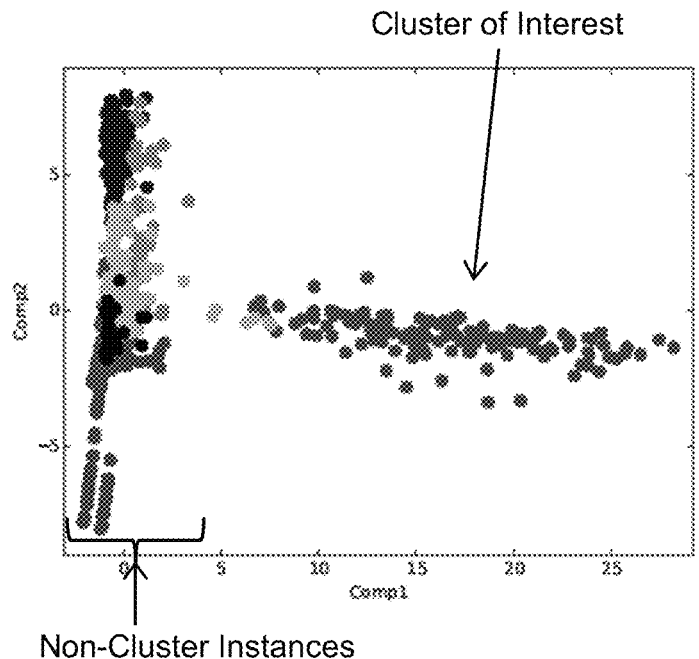

FIGURE 4A

| CLUSTER | DESCRIPTION |
|---|---|
| Cluster 1 | Cluster Has IP address *.*.*.* |
| Cluster 2 | Cluster Has Register Access * <br> Cluster Has Register Access * <br> Cluster Does Not Have Registry Access * |
| Cluster 3 | Cluster Has File Access * <br> Cluster Does Not Have File Access * <br> Cluster Does Not Have File Access * |
| Cluster 4 | Cluster Does Not Have IP Address *.*.*.* <br> Cluster Does Not Have Access * <br> Cluster Does Not Have Registry Access * |
| Cluster 5 | Cluster Has Register Access * <br> Cluster Has Register Access * |
| Cluster 6 | Cluster Has Register Access * |
| Cluster 7 | Cluster Does Not Have IP Address *.*.*.* <br> Cluster Does Not Have File Access * |

FIGURE 4B

AUTOMATIC GENERATION OF CLUSTER DESCRIPTIONS

TECHNICAL FIELD

The present disclosure relates generally to cluster data, and more particularly, to techniques for generating cluster descriptions.

BACKGROUND

With more domains producing a seemingly unending amount of data, machine learning techniques to categorize and make sense of data is of paramount importance. One machine learning concept, clustering, is heavily used in many fields including cybersecurity. Computer networks are exposed to a variety of different attacks that expose vulnerabilities of computer systems in order to compromise their security. An intrusion detection system is one example of a system that may be used to monitor network traffic and detect anomalies occurring in the network. The intrusion detection system may, for example, detect an anomaly in a network when the system determines that a pattern of the monitored traffic appears to be suspicious or matches a signature of a known attack on the network. Conventional techniques for creating signatures for malware often require visual review of cluster data.

BRIEF DESCRIPTION OF THE FIGURES

FIG. 4A is an example of a graph showing clustered data.

FIG. 4B is a table comprising descriptions of the clustered data.

Corresponding reference characters indicate corresponding parts throughout the several views of the drawings.

DESCRIPTION OF EXAMPLE EMBODIMENTS

Overview

Figure 1:
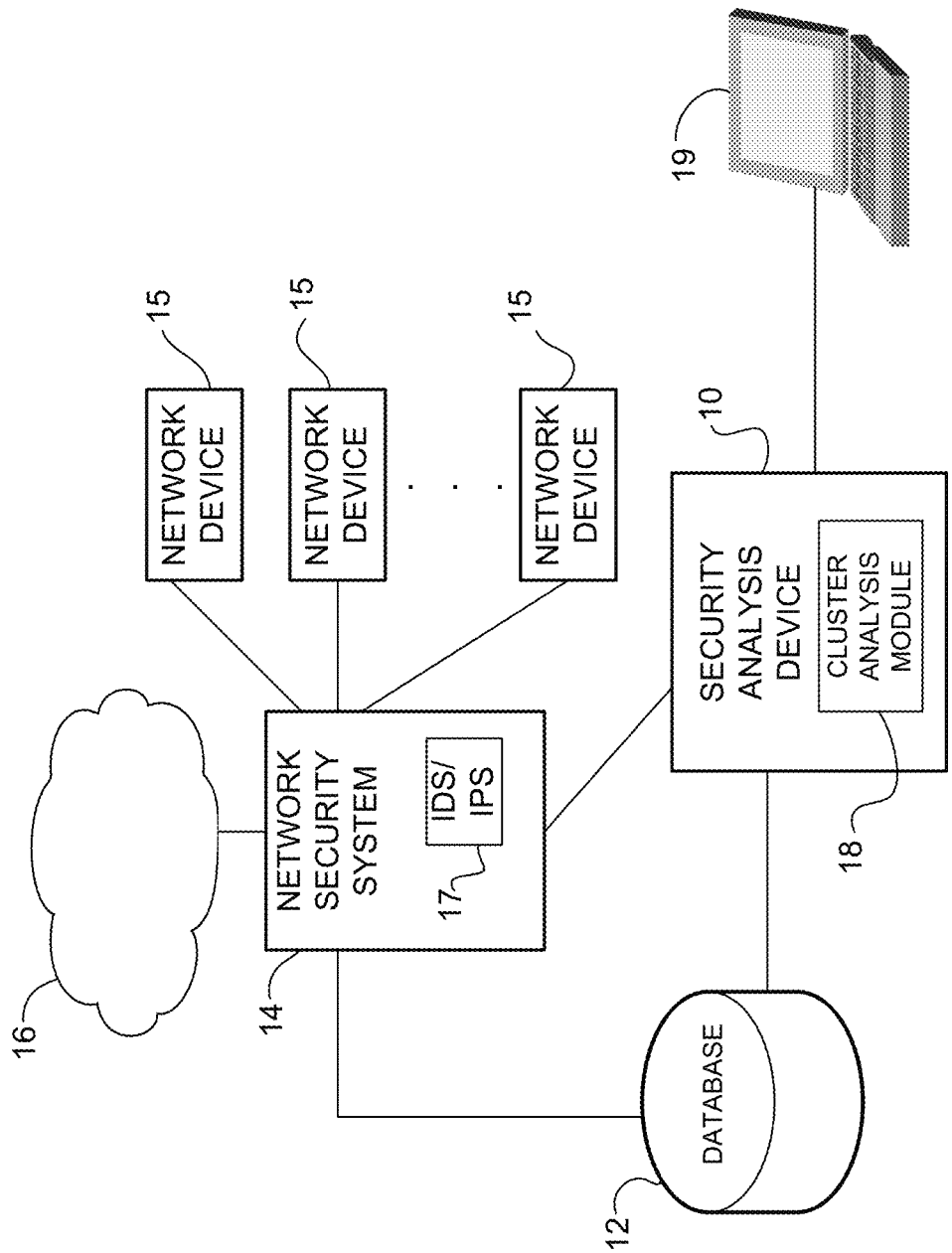
FIG. 1 illustrates an example of a network in which embodiments described herein may be implemented.

In one embodiment, a method generally comprises receiving data associated with a cluster at a computer and processing the data at the computer to automatically generate a description of the cluster. The data includes cluster data comprising data within the cluster and non-cluster data comprising a remaining set of the data. The description comprises a minimal set of features that uniquely defines the cluster to differentiate the cluster data from the non-cluster data.

In another embodiment, an apparatus generally comprises a processor operable to process data associated with a cluster and automatically generate a description of the cluster. The data includes cluster data comprising data within the cluster and non-cluster data comprising a remaining set of the data. The description comprises a minimal set of features that uniquely defines the cluster to differentiate the cluster data from the non-cluster data. The apparatus further comprises memory for storing the data and description.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Clustering algorithms may be used to find similar features in all instances within a cluster. For example, in the malware domain, clustering techniques may be used since malware instances can naturally be grouped into malware families. After the clustering algorithm is applied in conventional systems, engineers may need to create the actual meaning of the cluster. Generation of this meaning and transferring it into a machine readable format is a time consuming process that can take days to complete.

Furthermore, conventional signature generating approaches may not find the smallest set of features that uniquely define a cluster. Since identified signatures are often quite large, it may be difficult for a human to reason about why a cluster is unique. Also, conventional systems typically do not use non-cluster instances in their signature definition. Without comparing results against instances belonging to other families, there is no guarantee about the fidelity of the signature. The signature may include features that are common among every instance in the dataset, thus leading to false positives.

The embodiments described herein utilize optimization techniques to find a minimal set of features that differentiate one cluster from a remaining set of data. The embodiments may be used to identify a set of features that give a semantic description of the cluster. Attaching semantic meaning to a cluster has numerous benefits, including the ability for such a description to be both human and machine readable. For example, given a set of clusters, certain embodiments may be used to automatically generate high fidelity, low false positive human and machine readable descriptions that can be quickly propagated to help contain the spread of malware through the use of network security equipment. The embodiments may also be used to generate cluster descriptions for other technology domains that use clustered data.

Referring now to the drawings, and first to FIG. 1, an example of a network in which embodiments described herein may be implemented is shown. For simplification only a small number of nodes are shown. The network includes a security analysis device 10, which receives data from a database 12 or network security system 14. The database 12 may include for example, network performance data, IP (Internet Protocol) addresses, registry access, file system access, or any other data, which may be collected by the network security system 14. The network security system 14 may manage security aspects of communications between network devices 15 and untrusted network 16. The security analysis device 10 may also receive network anomaly data from an Intrusion Detection System (IDS) (anomaly detection system)/Intrusion Prevention System (IPS) 17 located at the network security system 14 or at a separate network device. In the example shown in FIG. 1, the security analysis device 10 is in communication with a computer 19 (e.g., administrator computer) that may be used to retrieve descriptions of clusters from the security analysis device or input parameters for use in description generation (e.g., threshold value).

The network may comprise any number of network devices 15 (e.g., hosts, endpoints, user devices, servers, computers, laptops, tablets, mobile devices, or other devices) in communication via any number of nodes (e.g., routers, switches, controllers, gateways, access layer devices, aggregation layer devices, edge devices, core devices, or other network devices (not shown)), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, Internet, intranet, radio access network, public switched network, or any other network).

The network security system 14 may comprise, for example, a firewall or other device operable to control network traffic by applying a set of rules to traffic, thus limiting traffic flow between trusted network devices 15 and untrusted external network 16. The network security system 14 may also collect network performance data for traffic exchanged between network devices 15 and external network 16. Network performance data may include information about communications between devices, clients, users, subnetworks, and the like. Network performance data may also include information specific to file transfers initiated by the devices 15, exchanged emails, retransmitted files, registry access, file access, network failures, device failures, and the like. Other data such as bandwidth, throughput, latency, jitter, error rate, and the like may also be collected by the network security system 14. The network security system may also be distributed throughout the network or operate at one or more of the network devices 15 (e.g., mobile device or other endpoint) or any other network device (firewall, gateway, threat prevention appliance, etc.).

The IDS 17 may monitor data traffic and determine whether any malicious activities or policy violations occurred in the network. The IDS 17 may, for example, identify possible incidents of malicious activities and suspicious traffic, log information about the malicious activities, and report violation attempts. In one example, the IDS 17 may utilize a signature-based approach to detect threats by monitoring data packets in the network. The IDS 17 may also look for patterns in data packets in the network and match the patterns to signatures of known security threats. The IDS 17 may be implemented, for example, in a firewall and may execute applications designed to detect malware. Upon detecting such an activity or a violation, the IDS 17 may transmit information to a system administrator or network management station. The IPS may operate to prevent a detected threat from succeeding. The security analysis device 10 may provide signatures or other information on security threats to the IDS/IPS 17 within the network or located in another network.

The security analysis device 10 may be any computer or network device (e.g., server, controller, appliance, management station, or other processing device or network element) operable to receive network performance data and, based on the received information, identify features in which an anomaly deviates from other features. The security analysis device 10 may, for example, learn what causes security violations by monitoring and analyzing behavior and events that occur prior to the security violation taking place, in order to prevent such events from occurring in the future. One or more embodiments may be used to automatically generate optimal signatures, which can then be quickly propagated to help contain the spread of a malware family.

In one embodiment, the security analysis device 10 includes a cluster analysis module 18 configured to process data received from the database 12 or network security system 14. As described in detail below, the security analysis device 10 receives data associated with a cluster. The data comprises cluster data (i.e., data within the cluster of interest) and non-cluster data (i.e., remaining set of data (data not within the cluster of interest)). The non-cluster data may include data from one or more other clusters. The security analysis device 10 processes the data (cluster and non-cluster data) to automatically generate a description of the cluster. The description comprises a minimal set (e.g., minimum set, smallest set, optimum set) that is needed to uniquely define a data cluster. The set of features may define the data cluster with respect to another dataset (e.g., instances or samples not in the cluster) to differentiate one cluster from a remaining set of data (non-cluster data) (e.g., instances, samples, other clusters). The use of non-cluster data in the optimization formulation allows the resulting description to be minimal and reduces the possibilities of (or eliminates) false positives. The description may comprise, for example, malware signatures for use at the network security system 14. Indicators of malware or other security threats may also be sent to customers for use in their security systems. The embodiments may also be used for other datasets, including, for example, network packets, command line arguments, and the like.

It is to be understood that the network shown in FIG. 1 and described above is only an example and that the embodiments described herein may be implemented in networks having different network topologies or network devices, without departing from the scope of the embodiments. For example, the cluster analysis module 18 may be installed in any computer operable to receive data from one or more sources and output cluster descriptions. Also, as noted above, the cluster analysis module 18 may be used to analyze clustered data for environments other than a computer network environment. For example, the cluster analysis module 18 may receive data offline and output human or machine readable descriptions of clusters for use in any technological field using clustered data.

The term "human readable" as used herein may refer to any data (e.g., text, identifiers, rules, indicators) that can be interpreted by a human. For example, as described below, the cluster description may comprise a set of features (e.g., connects to IP address range x.x.*.*, does not have file access*) that uniquely define the cluster, thus making it easy for a human to understand. The term "machine readable" as used herein may refer to any data that may be input to a computer and processed by the computer. For example, the cluster description may comprise an indicator or rule (e.g., set of strings, Boolean expression, logic, file) that may be used by a platform such as YARA or STIX (Structured Threat Information Expression) through a command-line interface or python script.

Figure 2:
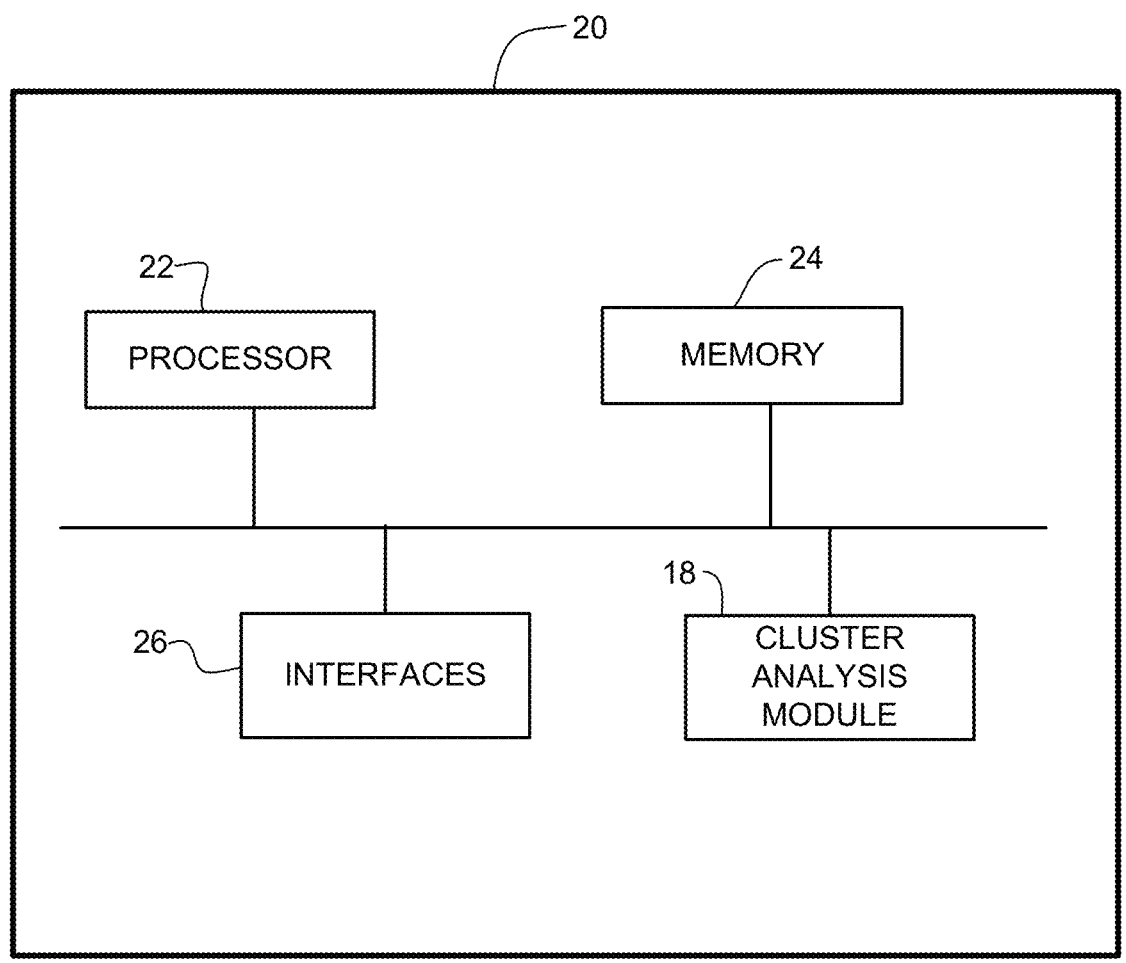
FIG. 2 depicts an example of a network device useful in implementing embodiments described herein.

FIG. 2 is a block diagram illustrating an example of a network device (computer) 20 (e.g., security analysis device 10 in FIG. 1) that may be used to implement embodiments described herein. The network device 20 is a programmable machine that may be implemented in hardware, software, or any combination thereof. The network device 20 includes a processor 22, memory 24, interfaces 26, and the cluster analysis module (e.g., software, firmware, code, logic) 18. Memory 24 may be a volatile memory or non-volatile storage, which stores various applications, modules, and data for execution and use by the processor 22. Memory 24 may store, for example, one or more components of the cluster analysis module 18.

Logic may be encoded in one or more tangible computer readable media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The interfaces 26 may comprise any number of interfaces (linecards, ports) for receiving data or transmitting data to other devices. The network interface 16 may include, for example, an Ethernet interface for connection to a computer or network. The network interfaces 26 may be configured to transmit or receive data using a variety of different communication protocols. The interfaces 16 may include mechanical, electrical, and signaling circuitry for communicating data over physical links coupled to the network.

It is to be understood that the network device 20 shown in FIG. 2 and described above is only an example and that different configurations of network devices may be used. For example, the network device 20 may further include any suitable combination of hardware, software, algorithms, processors, devices, components, modules, or elements operable to facilitate the capabilities described herein.

Figure 3:
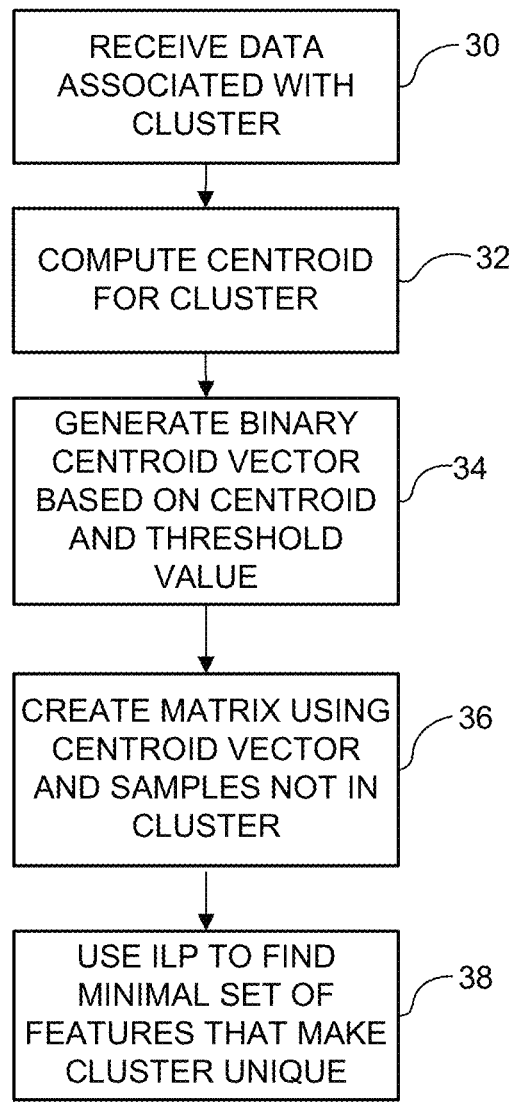
FIG. 3 is a flowchart illustrating an overview of a process for automatic generation of cluster descriptions.

FIG. 3 is a flowchart illustrating an overview of a process for automatically generating a cluster description, in accordance with one embodiment. At step 30, data associated with a cluster is received at a computer (e.g., security analysis device 10 in FIG. 1). The data includes samples within the cluster (cluster data) and samples not within the cluster (non-cluster data). As described below, non-cluster instances are included in the optimization process. The use of samples outside of the cluster (non-cluster data) in the optimization formulation allows for a minimal set of features and reduces (or eliminates) false positives. The data may be transmitted (or pulled) from the database 12, the network security system 14, or one or more other databases or network devices (FIG. 1). The data may also be input directly into the computer (e.g., from removable media or other input device). The security analysis device 10 processes the data to automatically generate a description of the cluster comprising a minimal set of features that uniquely defines the cluster (steps 32-38).

In one embodiment, the cluster data is processed to compute a centroid for the cluster that is being analyzed (step 32). This may be done by taking the average over all feature vectors for the given cluster, as described further below. The centroid is then thresholded to obtain a binary centroid vector (vector of 1's and 0's) (step 34). A threshold value is used to eliminate features that do not contain enough support within a cluster to be included in the description. The threshold value may be a predefined value or may be user configured. A matrix is then created by comparing the centroid vector to data not within the cluster (step 36). The matrix may be, for example, an n×m matrix, wherein n is the number of samples not in the cluster (non-cluster data) and m is the number of features in the centroid of the cluster. As described in detail below, each row of the matrix is computed by taking the absolute value of the difference between the centroid and a sample not belonging to the cluster. With the matrix defined, the problem can be cast as an integer linear program and solved to find the minimal features that make the cluster unique (step 38). The solution will be a vector of 1's and 0's describing whether or not a specific feature is important to the description of the cluster. The features that make a cluster unique do not necessarily have to be positive features for the cluster. For example, it may be the case that lacking a feature (or features) is what makes the cluster unique.

It is to be understood that the process illustrated in FIG. 3 and described above is only an example and that steps may be added, removed, or modified, without departing from the scope of the embodiments. Also, it may be noted that the processor 22 or the cluster analysis module 18 shown in FIG. 2 (or a combination thereof) may implement one or more of the steps shown in FIG. 3 and described herein. For example, logic encoded on a computer readable media and executed by the processor 22 may be operable to perform one or more steps shown in FIG. 3 and described above.

The following describes a simplified example of the process described in the flowchart of FIG. 3. As noted at step 32, a centroid is computed for the cluster that is being analyzed. This is done by taking the average over all feature vectors for the given cluster. For example, there may be three samples in a cluster with the following feature vectors:

$$\begin{bmatrix} [0, & 0, & 1, & 0] \\ [1, & 0, & 1, & 1] \\ [1, & 0, & 1, & 0] \end{bmatrix}$$

Then the centroid for the cluster would be [0.66, 0.0, 1.0, 0.33]. After this step, the centroid is thresholded to obtain a vector of just 1's and 0's (step 34 in FIG. 3). As previously noted, the threshold value helps to eliminate features that do not contain enough support within a cluster to be used. For a threshold value of t, any feature in the centroid $f_i$ that is greater than t is set to one, any feature less than (1.04) is set to zero, and all other features in the centroid are discarded:

$$f_i = \begin{cases} 1 & \text{if } f_i \geq t \\ 0 & \text{if } f_i \leq 1.0 - t \\ \text{discard} & \text{otherwise} \end{cases}$$

For example, with a threshold value of 0.9, the centroid [0.66, 0.0, 1.0, 0.33] is converted to vector [–, 0, 1, –], in which only the second and third features are retained (first and last features are discarded).

The threshold used in the above equation helps the integer linear program avoid infeasible solutions by relaxing the definition for what it means for a feature to be important to a cluster. In the example above, t=0.9. This value may be automatically tuned with the presence of a holdout set to check for false positives and by checking for infeasible solutions.

In one embodiment, the problem of finding the minimal set of distinguishing features is cast as an integer linear program (ILP):

$$\begin{aligned} \min \quad & c^T x \\ \text{subject to} \quad & Ax \geq b \\ & x \geq 0 \\ \text{and} \quad & x \in \{0, 1\} \end{aligned}$$

In the above formulation, b is a length n vector of 1's where n is the number of samples not in the current cluster. A is an n×m matrix where m is the number of features in the centroid of the current cluster. Each row of A may be computed by taking the absolute value of the difference between the centroid and a sample not belonging to the cluster. Thus, each row is a vector representing each data instance's distance from the centroid, with the matrix containing one row for each instance not in the cluster. For example, assuming the previous centroid, [–, 0, 1, –], and samples:

$$\begin{bmatrix} [1, 1, 1, 1] \\ [0, 0, 0, 1] \\ [0, 1, 1, 0] \\ [1, 1, 1, 0] \\ [0, 0, 0, 1] \end{bmatrix}$$

The following matrix A would be produced:

$$\begin{bmatrix} 1 & 0 \\ 0 & 1 \\ 1 & 0 \\ 1 & 0 \\ 0 & 1 \end{bmatrix}$$

In one embodiment, x is a vector representing the different features in the centroid. If $x_i=1$, this would be interpreted as the i'th feature having discriminatory power with respect to the current cluster. S, where $\forall i \in S$, $x_i=1$, is the minimal set of features that uniquely defines the cluster. In this most general form, the features that make a cluster unique do not necessarily have to be positive features for that cluster, and it may be the case that lacking a feature (or features) is what makes the cluster unique. In the previous example, the $Ax \geq b$ constraint is equivalent to the following system of equations:

$1.0 \cdot x_1 + 0.0 \cdot x_2 \geq 1.0$ $0.0 \cdot x_1 + 1.0 \cdot x_2 \geq 1.0$ $1.0 \cdot x_1 + 0.0 \cdot x_2 \geq 1.0$ $1.0 \cdot x_1 + 0.0 \cdot x_2 \geq 1.0$ $0.0 \cdot x_1 + 1.0 \cdot x_2 \geq 1.0$ which is solved when both $x_1$ and $x_2$ are set to 1. While this is a trivial example, it demonstrates the basic reasoning for making use of an integer linear program.

While using a linear program instead of an integer linear program would seem advantageous because solving an integer linear program is NP-complete, the solution to the linear program may not make sense in the context of deriving simple, human readable descriptions of the data. For example, the meaning of a cluster having feature $x_i$ is much more interpretable than a cluster having ⅔ of feature $x_i$.

Any suitable optimization library may be used including, for example, python and CVXOPT (convex optimization) library with GLPK (GNU Linear Programming Kit) bindings. GLPK uses a branch-and-cut algorithm for its integer linear programming optimization. It is to be understood that these are only examples and other optimization libraries may be used.

It may be noted that although the description herein refers to cluster data, if the cluster centroid is replaced by a single instance the algorithm would perform the same and the output would be a human and machine readable description of what makes a specific instance unique. Thus, the algorithm could be used to generate a signature for a specific sample.

In one example, the embodiments described herein may be used to find a set of features for malware clustering. In the malware domain, clustering is a natural approach because malware instances can be grouped into malware families. A malware family is a group of malicious programs that all contain some amount of similar code or functionality. A malware signature is a set of simple rules about observable parameters such as files, registry entries, and network communications, which are characteristics of a particular malware type. Given a set of clusters, the embodiments may be used to describe malware families in a way that a malware analyst can understand, such as "malware family A connects to IP range X.X.*.*, modifies registry value Y, creates file Z, and does not modify file W". This description is not only human readable, but can easily be converted into indicators of compromise.

The malware cluster descriptions may be propagated to other sites within an organization or to other organizations so that they can prevent or more quickly recover from an attack. This may be done, for example, through the use of YARA rules or STIX indicators, which may be used to propagate threat intelligence. YARA and STIX provide a standard format to report artifacts of a malware infection such as the strings contained within a malicious executable file. YARA may be used, for example, to create descriptions (rules) of malware families based on textual or binary patterns. It is to be understood that YARA and STIX are only examples and that other tools may be used to create descriptions (rules, indicators) of malware based on the minimal set of features identified for a cluster.

FIG. 4A is a graph illustrating an example of cluster data for instances of malware with various features (e.g., IP addresses, registry modifications, file system modifications) clustered by k-means with k=7. The graph shown in FIG. 4A includes data instances projected to a low dimensional feature space so that the data can be easily visualized. The graph includes a cluster of interest (cluster data) and non-cluster instances (remaining data). FIG. 4B is a table comprising descriptions computed by the embodiments described herein for the dataset shown in FIG. 4A. While the graph shown in FIG. 4A provides useful information with respect to the separability of the dataset, it does not provide a compact, human readable description of the clusters, as does the table of FIG. 4B.

The following describes a test conducted using the embodiments described herein on a large malware dataset. A test was also performed on the same dataset using a conventional method for generating signatures in which common features among all instances within a cluster are identified. In this test, a malware family (referred to as "Zeus") included 3,620 instances. Zeus is a toolkit that is intended to facilitate botnets and its primary purpose is to exfiltrate data.

All of the malware samples were run in a virtual machine that collected many behavioral characteristics of the sample. The runs only lasted five minutes so that the observed behavior corresponds to the initial infection. From the features collected, the registry modifications, file system modifications, and IP addresses communicated with were used as input into the clustering algorithm. It is to be understood that these features are only examples and that any feature that an analyst deems interesting may be used. In this example, the Zeus dataset contained 7,305 features.

The 3,620 instances of Zeus were clustered using a standard k-means algorithm with k=15. In this example, a combination of k-means and anti-virus labels were used to perform clustering. Alternatively, any clustering technique could be used. Table I below displays the resulting descriptions obtained utilizing the embodiments described herein. For comparison, Table II shows the resulting descriptions utilizing the conventional signature generation process.

TABLE I

| |
|---|
| Registry access: shellnoroam\muicache |
| Registry access: explorer\shell folders |
| Registry access: internet settings\zonemap |
| No file access: win.ini |

TABLE II

| |
|---|
| Registry access: explorer\user shell folders |
| Registry access: shellnoroam\muicache |
| Registry access: cryptography\rng |
| Registry access: explorer\mountpoints2 |
| Registry access: explorer\shell folders |
| Registry access: internet settings\zonemap |
| File access: wkssvc |
| File access: lsarpc |
| File access: r00000000000b.clb |
| File access: desktop.ini |

As can be seen by comparing Table I and Table II, the embodiments described herein generated a more compact description than the conventional method. This is due to the embodiments being able to use negative relationships such as not having a specific file access (e.g., no file access: win.ini). In these tests, the embodiments were also able to find a higher fidelity description. The descriptions identified by the embodiments hit 91.94% of the instances within the cluster and had no false positives. The descriptions identified with the conventional method hit 77.01% of the instances within the cluster, but also hit 3.38% of instances not in the cluster (false positives).

As can be observed from the foregoing, the embodiments described herein provide a compact, domain-specific explanation for clusters. In one embodiment, an integer linear program uses non-cluster instances, which allows for a minimal set of features and ensures that the generated description does not hold for samples belonging to other clusters. The generated descriptions may be used for human consumption or converted into indicators of compromise using various formats. The flexibility of the optimization problem and encoding of the data allows for negative relationships, which results in a method that is more robust to situations where the cluster does not have many common features.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
monitoring network traffic and detecting malware occurring in the network comprising:
receiving network traffic data associated with a cluster at a computer, the network traffic data includes cluster data comprising data within said cluster and non-cluster data comprising a remaining set of the network traffic data;
processing with a machine learning algorithm the network traffic data comprising the cluster data and the non-cluster data at the computer to automatically generate a description of said cluster, wherein said description comprises a minimal set of features that uniquely defines said cluster to differentiate said cluster data from said non-cluster data; and
transmitting said description of said cluster to a network security system, wherein said description comprises a machine readable rule or indicator of malware created based on said minimal set of features and wherein said minimal set of features is used by the network security system to identify said malware;
wherein processing the network traffic data to generate said description of said cluster comprises computing a centroid for said cluster, generating a vector based on said centroid and a threshold value, and creating a matrix by comparing said vector to said non-cluster data.

2. The method of claim 1 wherein said vector is generated according to:

$$f_i = \begin{cases} 1 & \text{if } f_i \geq t \\ 0 & \text{if } f_i \leq 1.0 - t \\ \text{discard} & \text{otherwise} \end{cases}$$

wherein t=said threshold value.

3. The method of claim 1 wherein creating said matrix comprises creating an n×m matrix, wherein n is a number of samples of said non-cluster data and m is a number of features in said centroid of the cluster.

4. The method of claim 3 wherein each row of the matrix is computed as the absolute value of a difference between said vector and said non-cluster data.

5. The method of claim 1 further comprising utilizing an integer linear program to identify said minimal set of features.

6. The method of claim 1 wherein processing the network traffic data comprises utilizing an optimization technique that includes said non-cluster data to reduce instances of false positives.

7. An apparatus to monitor network traffic and detect malware occurring in the network comprising:
a processor operable with a machine learning algorithm to process network traffic data associated with a cluster, automatically generate a description of said cluster, and transmit said description to a network security system for use in identifying malware; and
memory for storing the network traffic data and said description;
wherein the network traffic data includes cluster data comprising data within said cluster and non-cluster data comprising a remaining set of the network traffic data, and said description comprises a minimal set of features that uniquely defines said cluster to differentiate said cluster data from said non-cluster data, wherein said description comprises a machine readable rule or indicator of malware created based on said minimal set of features and wherein said minimal set of features is used by the network security system to identify said malware;

and wherein the processor is operable to compute a centroid for said cluster, generate a vector based on said centroid and a threshold value, and create a matrix by comparing said vector to said non-cluster data.

8. The apparatus of claim 7 wherein the processor is operable to utilize an integer linear program to identify said minimal set of features.

9. The apparatus of claim 7 wherein the processor is operable to utilize an optimization technique that includes said non-cluster data to reduce instances of false positives.

10. The apparatus of claim 7 wherein said matrix comprises an n×m matrix, wherein n is a number of samples of said non-cluster data and m is a number of features in said centroid of the cluster.

11. The apparatus of claim 10 wherein each row of the matrix is computed as the absolute value of a difference between said vector and said non-cluster data.

12. Logic encoded on one or more non-transitory computer readable media for execution and when executed operable to:

monitor network traffic and detect malware occurring in the network comprising:

processing network traffic data associated with a cluster, the network traffic data includes cluster data comprising data within said cluster and non-cluster data comprising a remaining set of the network traffic data;

automatically generating a description of said cluster, wherein said description comprises a minimal set of features that uniquely defines said cluster to differentiate said cluster data from said non-cluster data; and transmitting said description of said cluster to a network security system, wherein said description comprises a machine readable rule or indicator of malware created based on said minimal set of features and wherein said minimal set of features is used by the network security system to identify malware;

wherein the logic when executed is further operable to generate said description of said cluster comprises computing a centroid for said cluster, generate a vector based on said centroid and a threshold value, and create a matrix by comparing said vector to said non-cluster data.

13. The logic of claim 12 when executed further operable to utilize an integer linear program to identify said minimal set of features.

14. The logic of claim 12 wherein the logic is operable to utilize an optimization technique that includes said non-cluster data to reduce instances of false positives.

15. The logic of claim 12 wherein said matrix comprises an n×m matrix, wherein n is a number of samples of said non-cluster data and m is a number of features in said centroid of the cluster.

16. The logic of claim 15 wherein each row of the matrix is computed as the absolute value of a difference between said vector and said non-cluster data.

\* \* \* \* \*